(12) United States Patent
Lee

(10) Patent No.: US 9,004,275 B2
(45) Date of Patent: Apr. 14, 2015

(54) PROTECTIVE COVER FOR PORTABLE ELETRONIC DEVICE

(71) Applicant: Chi Mei Communication Systems, Inc., New Taipei (TW)

(72) Inventor: Chueh Lee, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/949,215

(22) Filed: Jul. 23, 2013

(65) Prior Publication Data

US 2014/0116898 A1   May 1, 2014

(30) Foreign Application Priority Data

Oct. 31, 2012   (TW) .................................. 101221007

(51) Int. Cl.
  *B65D 85/00*   (2006.01)
  *A45C 11/00*   (2006.01)
  *A45C 11/18*   (2006.01)

(52) U.S. Cl.
  CPC ............... *A45C 11/00* (2013.01); *A45C 11/182* (2013.01); *H04B 1/3888* (2013.01); *A45C 2011/002* (2013.01)

(58) Field of Classification Search
  CPC .......... A45C 2011/002; A45C 11/182; A45C 2011/003; A45C 2013/025; G06F 2200/1633; G06F 1/1628; H04M 1/04
  USPC ......................... 206/38, 320, 232; 455/575.8; 361/679.01, 679.02
  See application file for complete search history.

(56) References Cited

U.S. PATENT DOCUMENTS

| | | | |
|---|---|---|---|
| 7,702,372 B2 * | 4/2010 | Tu et al. ..................... | 455/575.1 |
| 8,381,904 B1 * | 2/2013 | Longinotti-Buitoni ....... | 206/320 |
| 2011/0294556 A1 * | 12/2011 | Carlberg et al. ........... | 455/575.8 |
| 2014/0128132 A1 * | 5/2014 | Cox, III ..................... | 455/575.8 |

\* cited by examiner

*Primary Examiner* — David Fidei
(74) *Attorney, Agent, or Firm* — Novak Druce Connolly Bove + Quigg LLP

(57) ABSTRACT

A protective cover for a portable electronic device includes a housing and a cover detachably mounted to the housing. The housing includes a first bottom wall, a first compartment, and a second compartment. The first compartment and the second compartment defined at two opposite sides of the housing. The first compartment is configured to receive the portable electronic device; the second compartment is configured to receive a card. The cover is configured to cover the second compartment.

10 Claims, 5 Drawing Sheets

PROTECTIVE COVER FOR PORTABLE ELETRONIC DEVICE

BACKGROUND

1. Technical Field

The exemplary disclosure generally relates to protective covers, and particularly to a protective cover for a portable electronic device.

2. Description of Related Art

Integrated chip (IC) cards, such as traffic pass cards, access cards, or identity cards for example, are widely used in people's life. These cards are typically received in a special bag to take. However, it is inconvenient to use.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
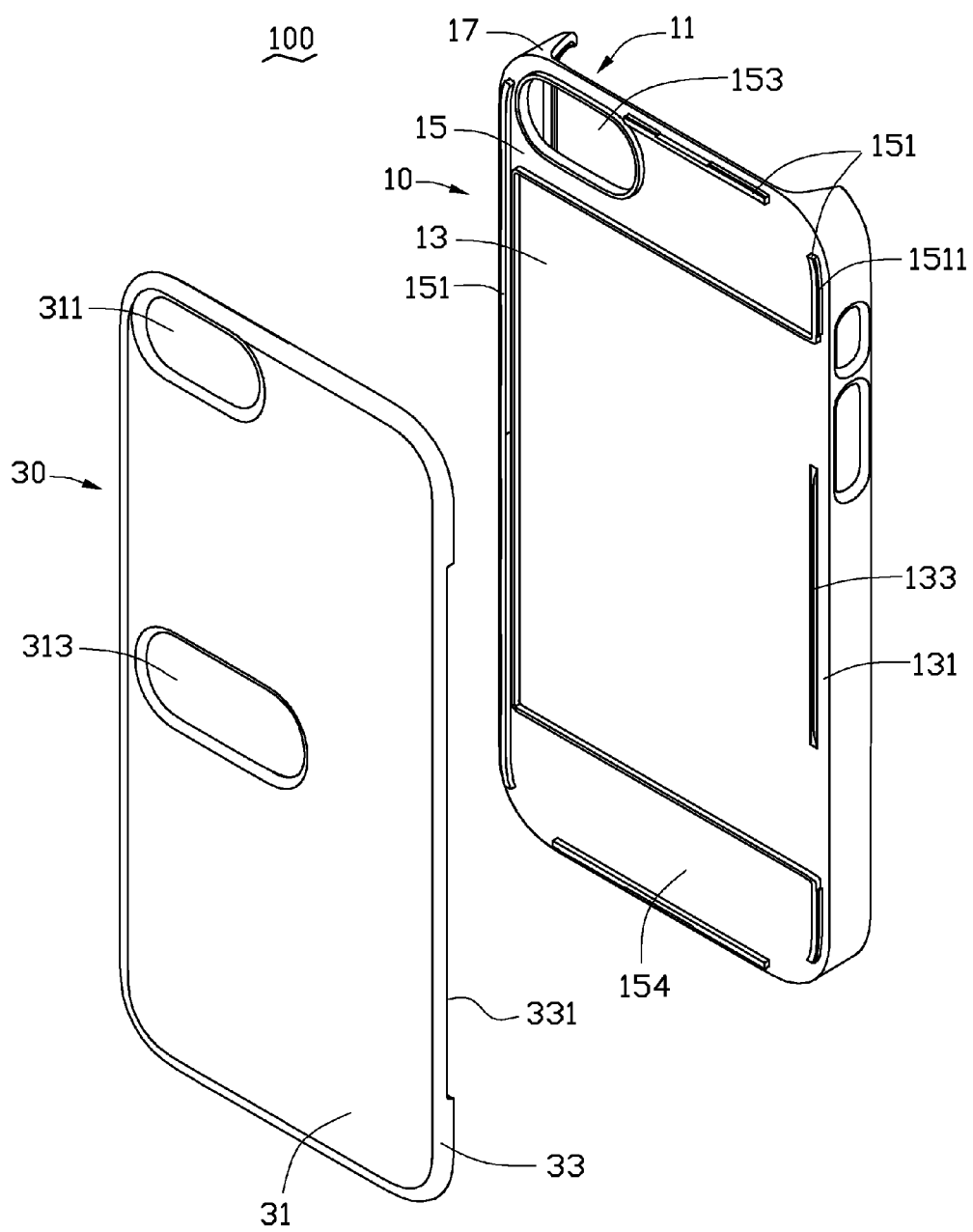
FIG. 1 shows an exploded view of an exemplary embodiment of a protective cover for a portable electronic device.
Figure 2:
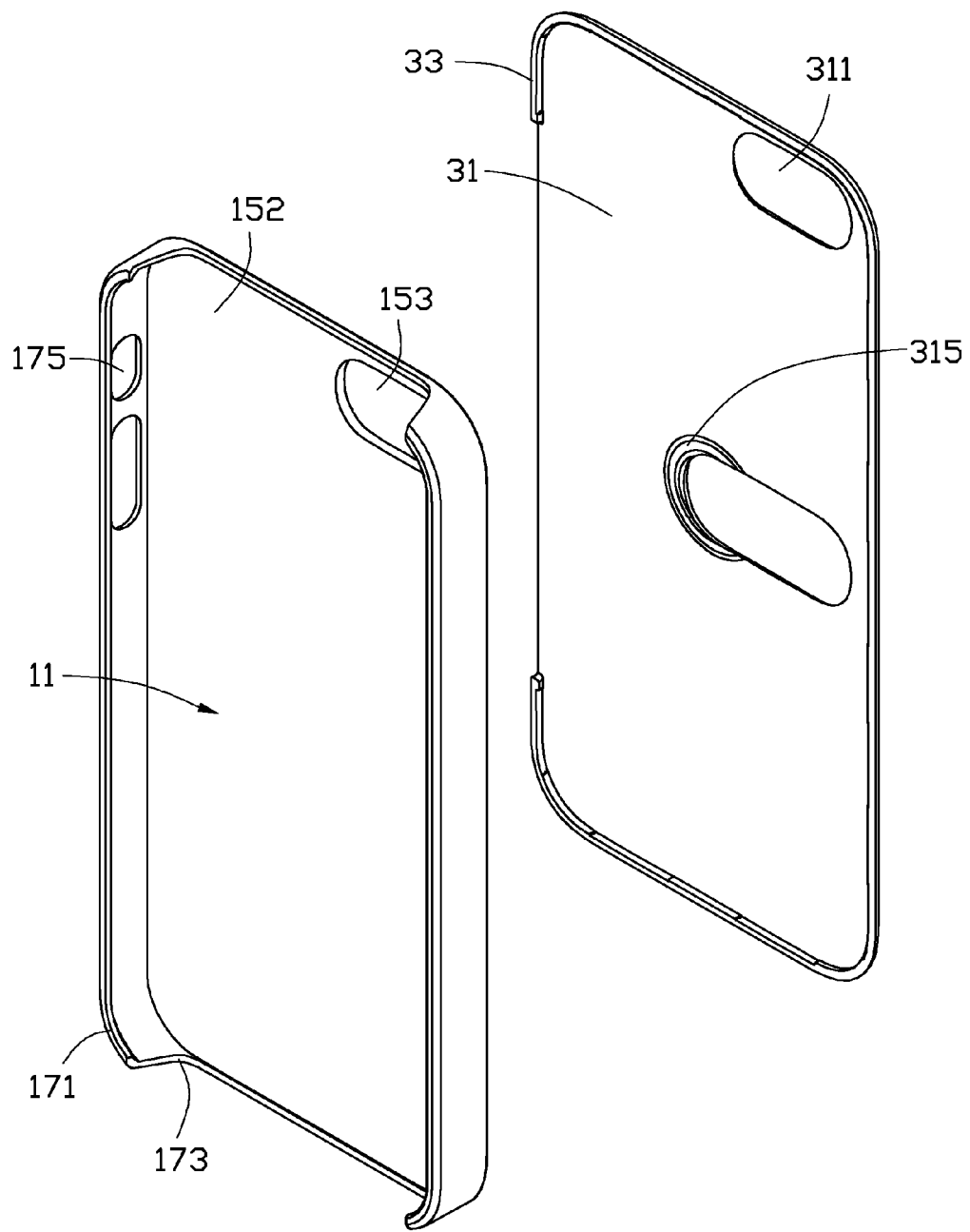
FIG. 2 is similar to the FIG. 1, but showing the protective cover in a second configuration.
Figure 3:
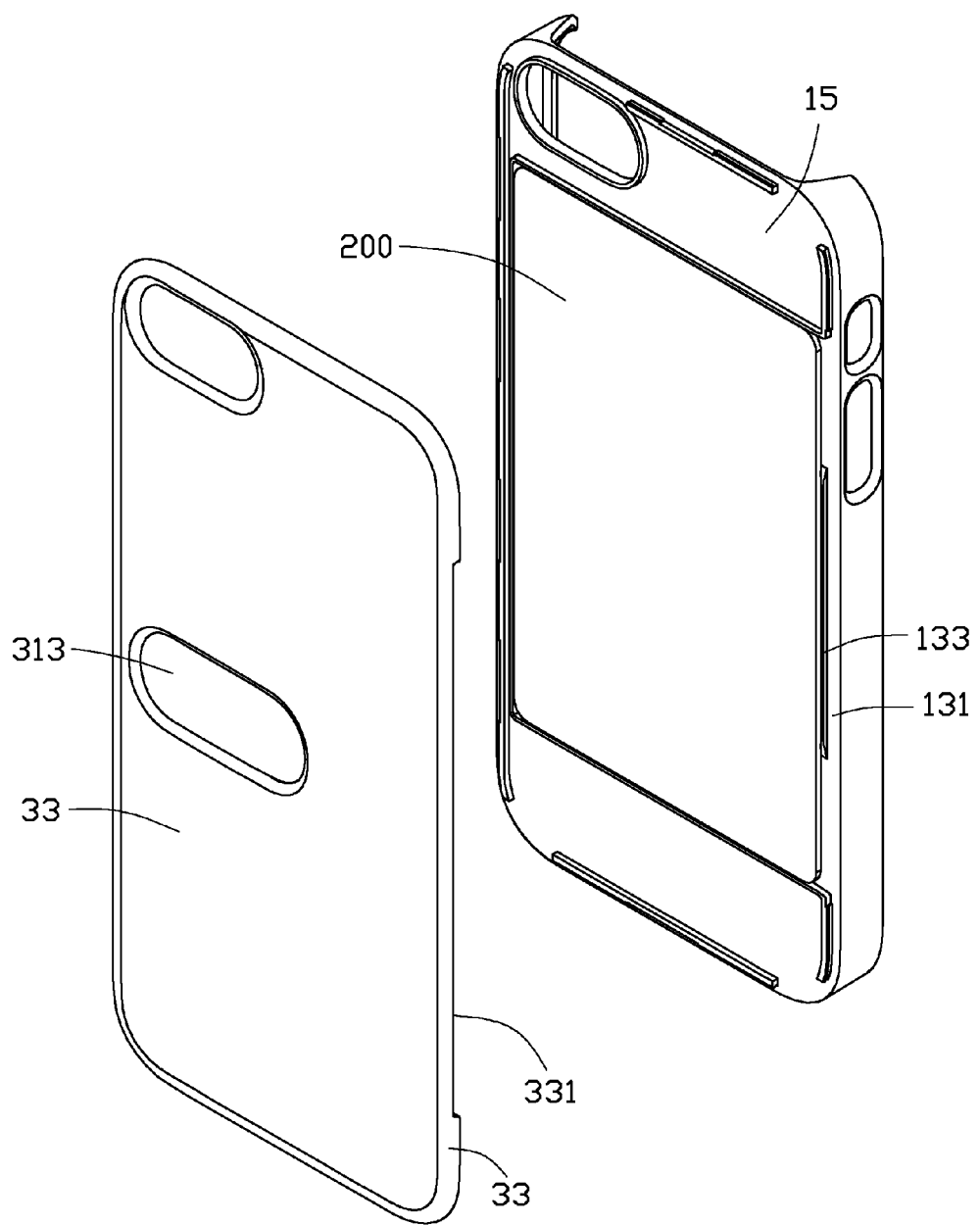
FIG. 3 is similar to the FIG. 1, but showing the protective cover holding a card.

FIG. 1 shows an exploded view of an exemplary embodiment of a protective housing 100 for a portable electronic device. FIG. 2 is similar to the FIG. 1, but showing the protective housing 100 in a second configuration. FIG. 3 is similar to the FIG. 1, but showing the protective housing 100 holding a card 200. The protective housing 100 includes a housing 10 and a cover 30 detachably mounted on the housing 10. The housing 10 includes a first compartment 11 and a second compartment 13. The first compartment 11 is defined in one side of the housing 10. The second compartment 13 is defined in the other side of the housing 10 opposite to the first compartment 11. The first compartment 11 is configured to receiving an electronic device (not shown), such as a mobile phone, a personal digital assistant (PDA), for example. The second compartment 13 is configured to receiving the card 200 (shown in FIG. 3). The card 200 can be a business card or an integrated chip (IC) card, such as a traffic pass card, an access card, or an identity card. The cover 30 covers onto and shields the second compartment 13, such that the card 200 is stably held in the second compartment 13.

The housing 10 further includes a first bottom wall 15 and a peripheral wall 17 protruding from a peripheral edge of the first bottom wall 15. The first bottom wall 15 includes a first side 152 and a second side 154 opposite to the first side 152. The first compartment 11 is defined by the first side 152 and the peripheral wall 17. The second compartment 13 is defined in second side 154.

Figure 5:
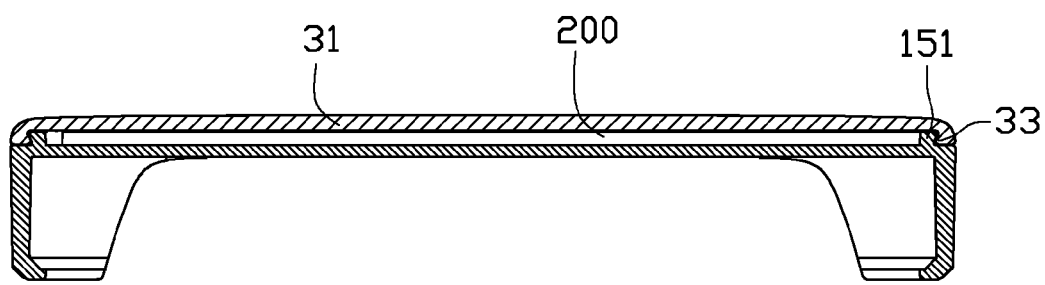
FIG. 5 shows a cross-sectional view of the protective cover shown in FIG. 4 taken along the line V-V thereof.

The first bottom wall 15 includes a plurality of latching blocks 151 protruding from an peripheral edge of the second side 154. Each latching block 151 has a latching slot 1511 defined at an outer side of the latching block 151. The cover 30 includes a second bottom wall 31 and a latching flange 33 protruding from a peripheral edge of the second bottom wall 31. The latching flange 33 is detachably latched to the blocks 151 (see FIG. 5), such that the cover 30 is latched to the housing 10, and shields the second compartment 13.

Figure 4:
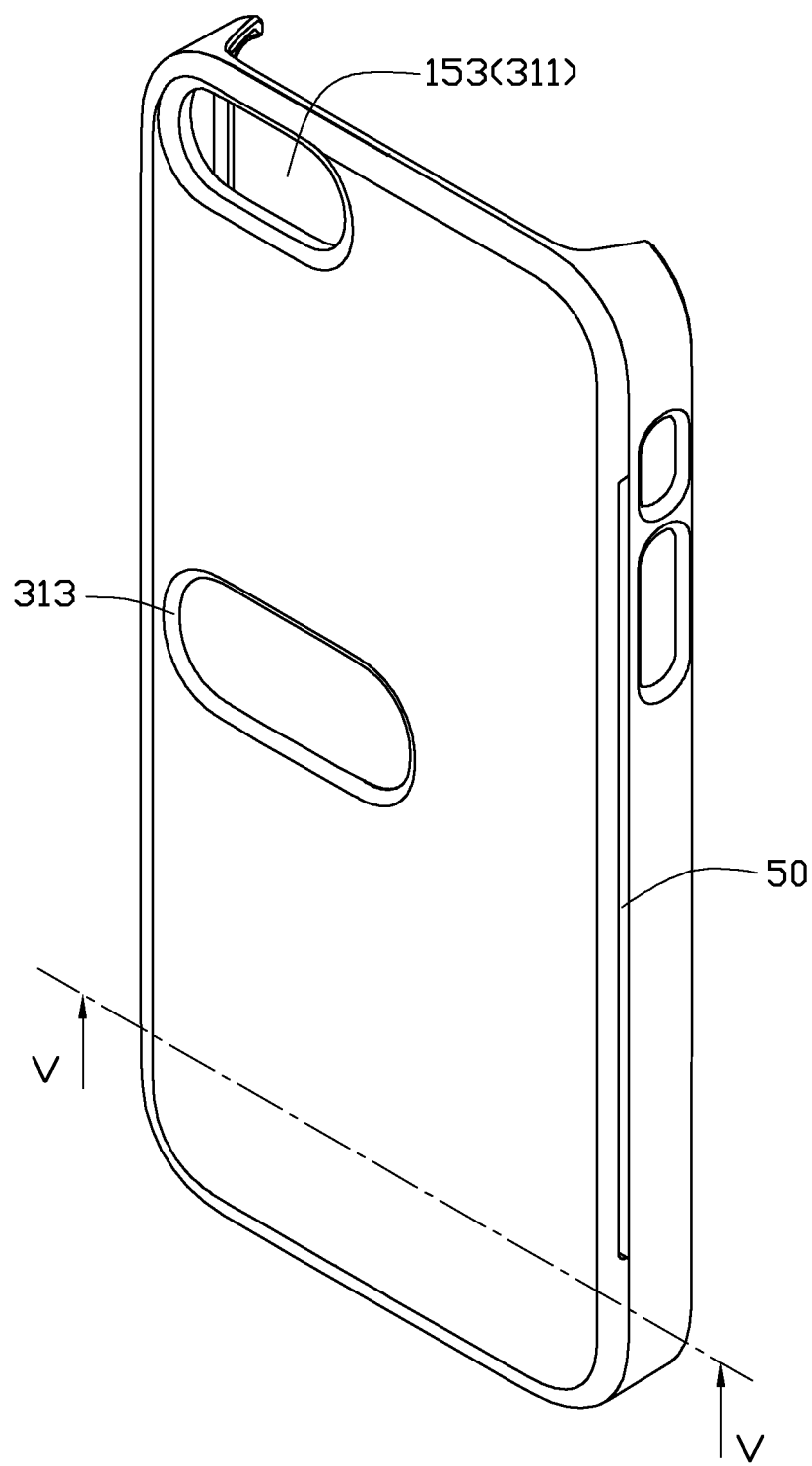
FIG. 4 shows an isometric view of the protective cover shown in FIG. 1.

The housing 10 includes an opening 131 communicating with the second compartment 13. The cover 30 includes a cutout 331 corresponding to the opening 131 and defined through the latching flange 33. When the cover 30 is mounted to the housing 10, the opening 131 aligns with the cutout 331, and cooperates with the cutout 331 in defining a card entrance 50 (shown in FIG. 4), which allows the card 200 to be inserted into the second compartment 13. In addition, a user can exert a force on the cover 30 by the entrance 50, to detach the cover 30 from the housing 10.

The second compartment 13 includes a positioning flange 133 adjacent to the opening 131. When the card 200 is received in the second compartment 13, the positioning flange 133 resists against one end of the card 200 (see FIG. 3), to prevent the card 200 from slipping out of the second compartment 13.

The housing 10 has a first camera hole 153 defined through the first bottom wall 15; the cover 30 has a second camera hole 311 defined through the second bottom wall 31. When the cover 30 is attached to the housing 10, the first camera hole 153 aligns with the second camera hole 155, to expose a camera of the portable electronic device receiving in the first compartment 11.

The cover 30 includes a latching portion 171, a interface hole 173, and a button hole 175. The latching portion 171 protrudes from a distal end of the peripheral wall 17 and is bent into the first compartment 11. The latching portion 171 detachably latches to the portable electronic device to retain the portable electronic device in the first compartment 11. The interface hole 173 is defined through the peripheral wall 17, to expose an interface of the portable electronic. The button hole 175 is defined through the peripheral wall 17, to expose a button of the portable electronic device.

The cover 30 has a through hole 313 defined through the second bottom wall 31. When the cover 30 is attached onto the housing 10, the through hole 313 communicates with the second compartment 13, to expose a portion of the card 200 received in the second compartment 13, such that a user can operate the card 200 through the through hole 313. For example, a user can exert a force on the exposed portion of the card 200 via the through hole 313, to push the card 200 to slip out of the second compartment 13 via the entrance 50. The cover 30 further includes a protrusion 315 (shown in FIG. 2) protruding from an inner surface of the second bottom wall 31. The protrusion 315 surrounds an edge of an end of the through hole 313. The protrusion 315 resists against the card 200 to retain the card 200 in the second compartment 13.

In summary, the protective cover 100 includes the first compartment 11 for receiving a portable electronic device, and the second compartment 13 for receiving the card 200, therefore, the protective cover 100 can either protect the portable electronic device or receive the card 200. In addition, the cover 30 is detachably mounted to the housing 10, such that a user can use different covers 30 with different colors and patterns.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A protective cover for a portable electronic device, comprising:

a housing comprising a first bottom wall, a first compartment, a second compartment, and a peripheral wall protruding from a peripheral edge of the first bottom wall, the first compartment and the second compartment defined at two opposite sides of the housing; the first compartment defined by the first bottom wall and the peripheral wall, and configured to receive the portable electronic device, the second compartment configured to receive a card;

the housing defining an opening communicating with the second compartment, and a positioning flange defined in the second compartment and adjacent to the opening; the flange configured to resist against one end of the card, to prevent the card from slipping out of the second compartment; and a cover detachably mounted to the housing and configured for covering the second compartment; the cover comprising a cutout aligning with the opening;

wherein the opening and the cutout cooperate to define an entrance configured to allow the card to be inserted into the second compartment.

2. The protective cover of claim 1, wherein the housing further comprises a block protruding from one of the two sides of the first bottom wall; the cover comprises a second bottom wall and a latching flange protruding from a peripheral edge of the second bottom wall, the latching flange detachably latches with the block.

3. The protective cover of claim 1, wherein the cover further comprises a second bottom wall and a through hole defined through the second bottom wall, the through hole communicates with the second compartment when the cover is mounted on the housing.

4. The protective cover of claim 3, wherein the cover further comprises a protrusion protruding from an inner surface of the second bottom wall, the protrusion surrounds an edge of an end of the through hole; the protrusion resists against the card to retain the card in the second compartment.

5. A protective cover for a portable electronic device, comprising:

a housing comprising a first bottom wall, a first compartment, a second compartment, and a peripheral wall protruding from a peripheral edge of the first bottom wall, the first compartment and the second compartment defined at two opposite sides of the housing; the first compartment defined by the first bottom wall and the peripheral wall; the housing defining an opening communicating with the second compartment, and a positioning flange defined in the second compartment and adjacent to the opening; and a cover detachably mounted to the housing and configured for covering the second compartment; the cover comprising a cutout aligning with the opening;

wherein the opening and the cutout cooperate to define an entrance configured to allow a card to be inserted into the second compartment; the flange is configured to resist against one end of a card, to prevent the card from slipping out of the second compartment.

6. The protective cover of claim 5, wherein the first compartment is configured to receive the portable electronic device, the second compartment is configured to receive a card; the cover retains the card in the second compartment.

7. The protective cover of claim 5, wherein the housing further comprises a block protruding from one of the two sides of the first bottom wall; the cover comprises a second bottom wall and a latching flange protruding from a peripheral edge of the second bottom wall, the latching flange detachably latches with the block.

8. The protective cover of claim 5, wherein the cover further comprises a second bottom wall and a through hole defined through the second bottom wall, the through hole communicates with the second compartment when the cover is mounted on the housing.

9. The protective cover of claim 8, wherein the cover further comprises a protrusion protruding from an inner surface of the second bottom wall, the protrusion surrounds an edge of an end of the through hole; the protrusion resists against the card to retain the card in the second compartment.

10. A protective cover for a portable electronic device, comprising:

a housing comprising a first bottom wall, a first compartment, a second compartment, and an opening communicating with the second compartment; the first compartment and the second compartment defined at two opposite sides of the housing; the first compartment configured to receive the portable electronic device, the second compartment configured to receive a card; and a cover detachably mounted to the housing and configured for covering the second compartment; the cover comprising a second bottom wall, a through hole defined through the second bottom wall, and a cutout aligning with the opening, the opening and the cutout cooperating to define an entrance configured to allow the card to be inserted into the second compartment; the through hole communicating with the second compartment when the cover is mounted on the housing;

wherein the cover further comprises a protrusion protruding from an inner surface of the second bottom wall, the protrusion surrounds an edge of an end of the through hole; the protrusion resists against the card to retain the card in the second compartment.

* * * * *